United States Patent
Iwasaki

[19]

[11] Patent Number: 5,803,623
[45] Date of Patent: Sep. 8, 1998

[54] PRINTING SYSTEM AND A PRINTING METHOD

[75] Inventor: Takumi Iwasaki, Nagano, Japan

[73] Assignee: Seiko Epson Corporation, Tokyo, Japan

[21] Appl. No.: 699,934

[22] Filed: Aug. 20, 1996

[30] Foreign Application Priority Data

Aug. 22, 1995 [JP] Japan .................................... 7-213842

[51] Int. Cl.⁶ ................................................ B41J 29/38
[52] U.S. Cl. ............................................ 400/54; 395/113
[58] Field of Search ............................ 400/54, 61, 76, 400/74; 395/114, 113, 112; 364/707

[56] References Cited

U.S. PATENT DOCUMENTS

| | | | |
|---|---|---|---|
| 4,589,785 | 5/1986 | Sato | 400/61 |
| 4,720,813 | 1/1988 | Kaneko | 364/900 |
| 4,891,769 | 1/1990 | Tasaki | 400/54 |
| 4,944,613 | 7/1990 | Fukushige et al. | 400/61 |
| 5,581,668 | 12/1996 | Oida et al. | 395/112 |
| 5,594,653 | 1/1997 | Akiyama et al. | 395/114 |
| 5,630,029 | 5/1997 | Kosukegawa | 395/113 |
| 5,636,332 | 6/1997 | Hibino | 395/112 |

FOREIGN PATENT DOCUMENTS

| | | | |
|---|---|---|---|
| 0 395 562 | 10/1990 | European Pat. Off. | 395/114 |
| 0 657 846 | 6/1995 | European Pat. Off. | 364/707 |
| 7-25179 | 3/1995 | Japan | 395/114 |

*Primary Examiner*—Edgar S. Burr
*Assistant Examiner*—Steven S. Kelley
*Attorney, Agent, or Firm*—Sughrue, Mion, Zinn, Macpeak & Seas, PLLC

[57] ABSTRACT

A printing system is disclosed in which a host computer 1 sends print data to a printer 2, and the printer 2 prints an image on a paper in accordance with the print data received. The printer 2 includes a printing mechanism 19 for performing a printing operation and a control unit 18 with a stand-by function. In the host computer 1, a printer driver 4 receives a print command from an application 3, and outputs removal data to the control unit 18 and then generates print data. Upon receipt of the removal data, the control unit 18 removes a stand-by status of the printer and places the printer in a wake-up status. The signal format of the removal data is the same as of the print data. Accordingly, a conventional interface may be used for the transmission of the removal data. Further, the data format of the removal data is the same as of the print data. Accordingly, the wake-up status of the printer may be removed by utilizing commands provided for some other purposes.

19 Claims, 5 Drawing Sheets

PRINTING SYSTEM AND A PRINTING METHOD

FIELD OF THE INVENTION

The present invention relates to a technique which reduces the time spent waiting for a printer to produce a first print when it performs a printing operation in accordance with print data received from a host computer. More particularly, the invention relates to a simplified and expedited method of causing a printer to move from waiting mode to operation mode.

DISCUSSION OF THE RELATED ART

Many printers have two operation modes, an "operation mode" and a "waiting mode". In the "operation mode", the printer quickly starts a printing operation. That is, it can print almost immediately any print data sent it by a host computer. The "waiting mode" is provided to save power and to minimize the abrasion of the related printer component parts. In the "waiting mode", the temperature of a thermal fixing unit of the printer is set at a waiting temperature that is lower than an operating temperature. The feeding of electric power to the thermal fixing unit is stopped. The rotating speed of the polygon mirror in an exposure optical system of the printer is set at a waiting speed that is lower than the operating speed thereof, or the rotation of the polygon mirror may be completely stopped. Therefore, before an actual printing, the printer must transition from waiting mode (also known variously as stand-by mode, and sleep mode) to operational mode. The time required to make this transition is not insignificant, and is time in which the printer is idle with respect to printing operations. When the printer is transitioning from waiting mode to operational mode, it is said to be in a wake-up mode. In wake-up mode, the printer is no longer in waiting mode, but has not yet achieved operational mode (e.g., the temperature of the thermal fixing device has not yet reached the required temperature). The attainment of the operational mode terminates the wake-up mode.

In one approach to transitioning from waiting mode to operational mode, when a printer is in the waiting mode, and when an application sends a print request to a printer driver of a host computer, the printer driver generates print data and sends it to the printer. The printer, in response thereto, begins transition from the waiting mode to the operational mode, and enters wake-up mode. After the wake-up mode is terminated, the printing mechanism starts a printing operation. This approach suffers from the problem that the time period from the instant that a print request is issued until the first print is produced (i.e., the first print waiting time) is long.

A printing machine and system which attempts to solve this problem is disclosed in Japanese Patent Publication No. Hei. 7-25179. Therein, when a host computer receives a print request from an input device (e.g., a keyboard), the host computer generates print data while, at the same time, sending a pseudo-start signal to the printer. Upon receipt of the pseudo-start signal, the printer enters wake-up mode. Accordingly, the print data generating process and the wake-up mode proceed concurrently on the host and the printer sides. Therefore, the first print waiting time may be reduced.

The approach, however, has its own disadvantages. First of all, the approach requires a signal line provided exclusively for removing the stand-by mode of is the printing mechanism (i.e., for causing wake-up mode to start). Moreover, the approach requires a special pseudo-start signal to cause the printer to leave the stand-by mode. Also, if the printing mechanism of the printer is in a normal operation mode instead of the stand-by mode, and if a pseudo-start signal is transmitted to the printer, the control unit of the printer may interpret the pseudo-start signal as a signal having some meaning and may an erroneous command. In other words, if the printer receives the pseudo-start signal when it is in operational mode, it may respond unpredictably and cause extraneous printed output or some other action.

For the purposes of this description, the term "printing mechanism" includes a mechanism for performing an actual printing operation, such as an electrophotographic machine which has an exposure optical unit, a Xerography process unit, and a thermal fixing unit. Those of skill in the art will recognize that other types of printers exist.

Those of skill in the art will also recognize that a variety of operations may be described by the term "remove a stand-by mode" as used with respect to a printer. The following operations are listed as being exemplary of operations which remove the stand-by mode of a printer:

A) an operation which removes a state in which (i) the thermal fixing unit is set at a stand-by temperature which is lower than the normally high thermal fixing temperature, such a state normally being for the purposes of reducing power consumption and lessening the abrasion of the related component parts in the printing mechanism, (ii) the feeding of current to the thermal fixing unit is stopped, and (iii) the polygon mirror is set at a low, stand-by rotating speed;

B) an operation which increases the temperature of the thermal fixing unit to a temperature high enough to allow the printing operation quickly to start; and C) an operation which increases the rotating speed of the polygon mirror in the exposure optical system to a preset rotating speed.

Along the same lines, the term "wake-up" means a restoring operation of the printing mechanism, which ranges from the removal of the stand-by mode to the setting-up of a printable state. Also, the term "removal data" refers to a message sent to cause a printer to wake-up by removing the printer's stand-by state.

SUMMARY OF THE INVENTION

The present invention has been made to solve the problems of the conventional printing system and has, as an object, the quick removal of a stand-by mode of the printing mechanism, thereby to reduce the first print waiting time. Another object of the present invention is to provide a printing system in which the stand-by mode of the printing mechanism is removed by transmitting print data indicative of removing the stand-by mode (i.e., removal data) from a host section to a printer section by way of a signal path usually used for print data transmission, instead of a special signal line, and in the same data format as normal print data, whereby if the removal data is sent to the printer while it is actually operating, the removal data does not have any adverse effect on the printer.

Printing systems may use a data format for print data which consists of (i) job data parts described in a job language and (ii) print information data parts described in a printer language. The job language is a high level command system introduced for providing easy printer management by the host section. The job language is capable of synthetically managing the functions of the printer at a high level, and is used, for example, for managing multiple printer language systems, the printer, configuration, the printer status, the setting of paper size from the host computer, and the like. In view of such a data format, another object of the present invention is to adapt, in a simple manner, the removal data to the data format of the normal print mode.

To achieve the above object, there is provided a printing system including a host section for generating and outputting print data and a printing section in which a printing mechanism contained therein performs a printing operation in accordance with the print data received from the host section, the printing system comprising: outputting means, included in the host section, for outputting to the printing section data indicative of removing a stand-by status of the printing mechanism before the outputting means outputs print data; print data generating means, included in the host section, for generating print data compatible with the printing section and outputting the generated print data to the printing section; a printing mechanism, included in the printing section, for performing a printing operation; and control means, included in the printing section, for setting up and removing a stand-by status of the printing mechanism, wherein the control means in the printing section removes the stand-by status of the printing mechanism in accordance with the removal data from the host section, and prints the print data received from the print data generating means. In this printing system, there is also provided an embodiment in which the removal data has the same signal format as of the print data, and is sent from the host section to the printing section by way of the same signal path as of the print data. In another embodiment, the removal data is not print data exclusively used for the removal of the stand-by status, and uses commands normally provided for some other purposes to remove the stand-by status.

The invention may be implemented with software and/or hardware. In one embodiment, there is provided a program supplying medium for supplying to a computer a program. The program is for causing the computer to execute a process for storing and converting image data and transferring the image data to a printing device, characterized in that the program supplying medium retains a set of instructions in the format that the computer can understand. This instruction set causes the computer to carry out a removal data outputting process in which the computer outputs to the printing device data indicative of removing a stand-by state of a printing mechanism contained in the printing device before the computer outputs print data. This instruction set also causes the computer to carry out a print data transmitting process in which, after outputting the data indicative of removing a stand-by status of a printing mechanism to the printing device, the computer generates print data compatible with the printing device and outputs the generated print data to the printing device.

In another embodiment, the program supplying medium mentioned above further includes a storage medium for fixedly storing the instruction set, or a communication medium for dynamically retaining the instruction set.

DESCRIPTION OF THE PREFERRED EMBODIMENTS

In the printing system and the printing method of the present invention, when a print command is issued from a keyboard, for example, the host section first sends to the printer section print data indicative of removing a stand-by status of the printing mechanism Is (i.e., removal data). Thereafter, the host section executes a process of generating normal print data. At this time, if the printer section has been in a stand-by mode, the control means that has received the print data indicative of the removal of the stand-by mode removes the stand-by mode. In turn, the wake-up operation starts in the printer section. After a preset time elapses, the printing mechanism will be ready for the printing operation. Thus, the data processing and the transmission of print data to the printing mechanism, which are performed in the host section, and the wake-up operation, which is performed in the printer section, concurrently progress. As a result, a time from the issuance of the print command until the first print is produced (i.e., the first print waiting time) is reduced.

The removal data is transmitted to the printer section in the signal format of the host interface, which is the same as for the normal print data. Therefore, the parallel interface based on the IEEE1284 protocol or the serial interface based on the RS232C protocol may be used; there is thus no need for an additional signal line. It is therefore highly desirable that the print data and the removal data have an identical signal format.

It is also very advantageous to harmonize the data format of the removal data with the data format of the print data. The data format of the normal print data, which has job data parts and print information data parts, is thus used as the data format of the removal data. The removal data, so formatted, can thereby remove the stand-by mode but cannot cause the printer to perform an erroneous printing operation. Therefore, if the removal data is sent to the printing mechanism while it is operating (i.e., while it is actually printing), the removal data does not have any adverse effect on the printing mechanism.

Figure 1:
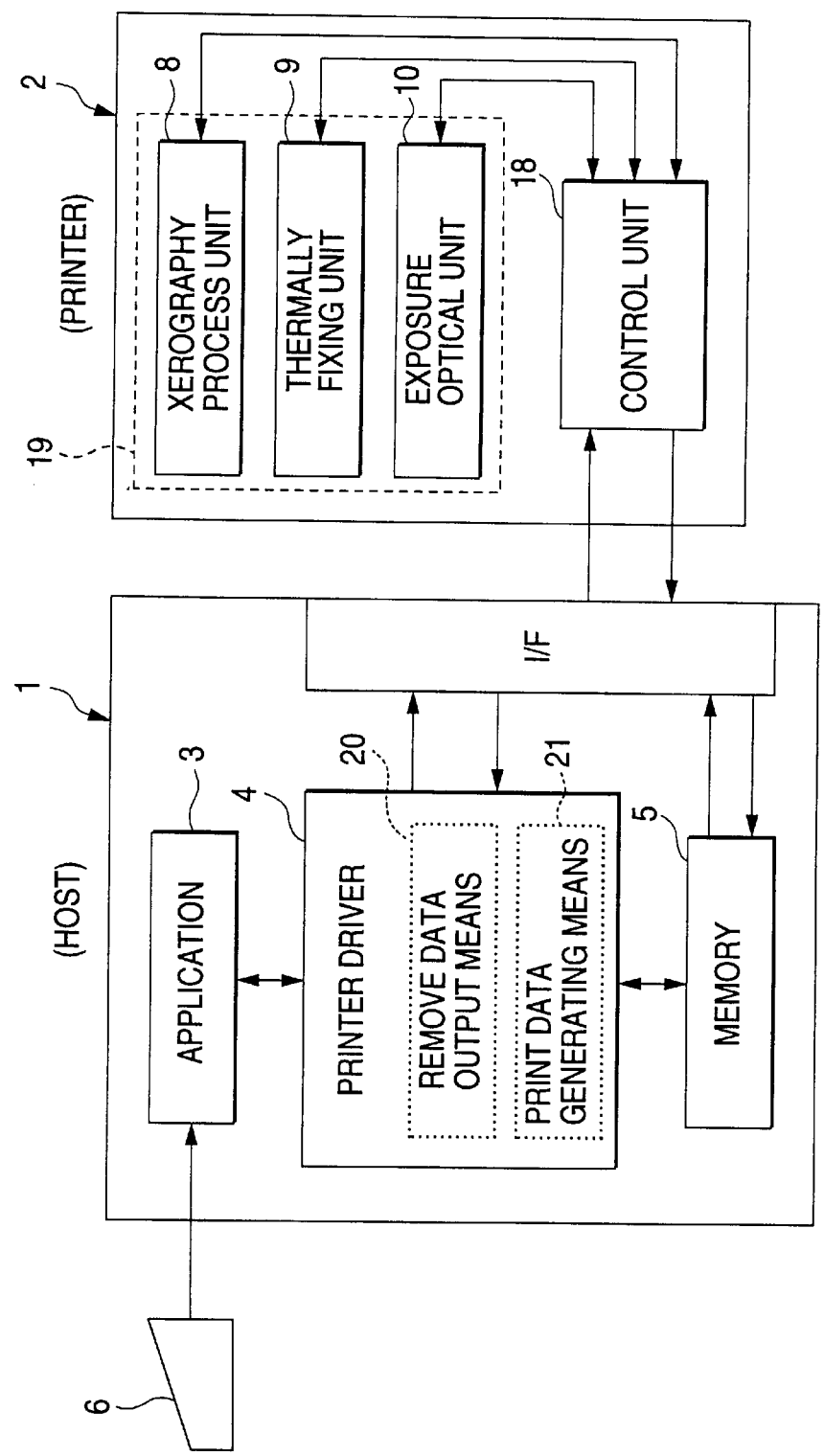
FIG. 1 is a block diagram schematically showing an embodiment of a printing system according to the present invention.

FIG. 1 shows, in block form, an embodiment of a printing system according to the present invention. The printing system is composed of a host computer 1 and a printer 2. The host computer 1 includes an application 3 stored in a preset memory location, a printer driver 4, and a memory 5 for storing print data. Commands are inputted to the application 3 from a keyboard 6. The printer driver 4 contains removal data output means 20, which responds to a print command from the application 3 to output removal data indicative of removing a stand-by mode of the printer, and print data generating means 21, which generates print data adaptable to the printer 2.

Figure 6:
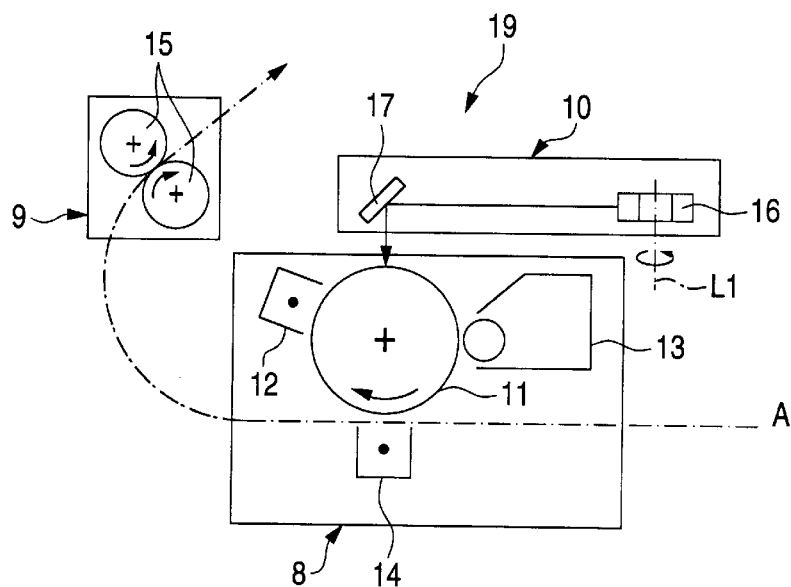
FIG. 6 is a diagram schematically showing an example of a printing mechanism.

The printer 2 is made up of a printing mechanism 19 including a Xerography process unit 8, a thermal fixing unit 9, an exposure optical unit 10, and a control unit 18 for controlling the printing mechanism. The Xerography process unit 8 includes a drum-like photoreceptor 11, a charge-applying charger 12, a developing unit 13, and a transfer charger 14. The thermal fixing unit 9 includes a pair of thermal rollers 15 which are heated and forcibly brought into contact with each other. The exposure optical unit 10 includes a polygon mirror 16 rotatable about an axis L1, and a reflecting mirror 17 (FIG. 6).

The printing mechanism 19 executes a known electrophotography process to print an image on a printing medium, for example, a print paper, which is moving in the direction of an arrow A. More specifically, the outer surface of the photoreceptor 11 is uniformly charged by the charge-applying charger 12, and scanned with a light beam containing an optical image, which is reflected from the rotating polygon mirror 16. As a result, an electrostatic latent image is formed on the outer surface of the photoreceptor. The developing unit 13 applies toner to the latent image to be developed into visual or toner images. The toner images are registered on a print paper being transported in the direction of the arrow A, and transferred onto the print paper by the transfer charger 14. Thereafter, the print paper bearing the toner image passes through the paired fixing rollers 15, so that the toner image is fused and fixed onto the print paper. The sequential steps of the electrophotography process are controlled by the control unit 18 shown in FIG. 1.

The electrophotography process is executed when the related component units of the printer 2 are set in an operating state. The "operating state" means a state such that the component units of the printer are ready to execute the electrophotography process. In the "operating state", the fixing rollers 15 are kept at temperature high enough to fuse toner, the polygon mirror 16 is kept at a high rotating speed necessary for a scan motion of an optical image, and the rotation of a cooling fan (not shown) for cooling the inside of the printer 2 is maintained.

An operation mode of the printer where the "operating state" is set up therein is referred to as an "operation mode". The printer 2 has another operation s mode called a "stand-by mode", in addition to the operation mode. The stand-by mode is used for the purposes of reducing power consumption and minimizing abrasion of the related component parts of the printer. In the stand-by mode, temperature of the fixing rollers 15 of the printer is set at a waiting temperature lower than an operating temperature. A rotating speed of the polygon mirror 16 is set at a waiting speed lower than the operating speed. The feeding of electric power to the fixing rollers 15, the polygon mirror 16 and the cooling fan is stopped.

Figure 2:
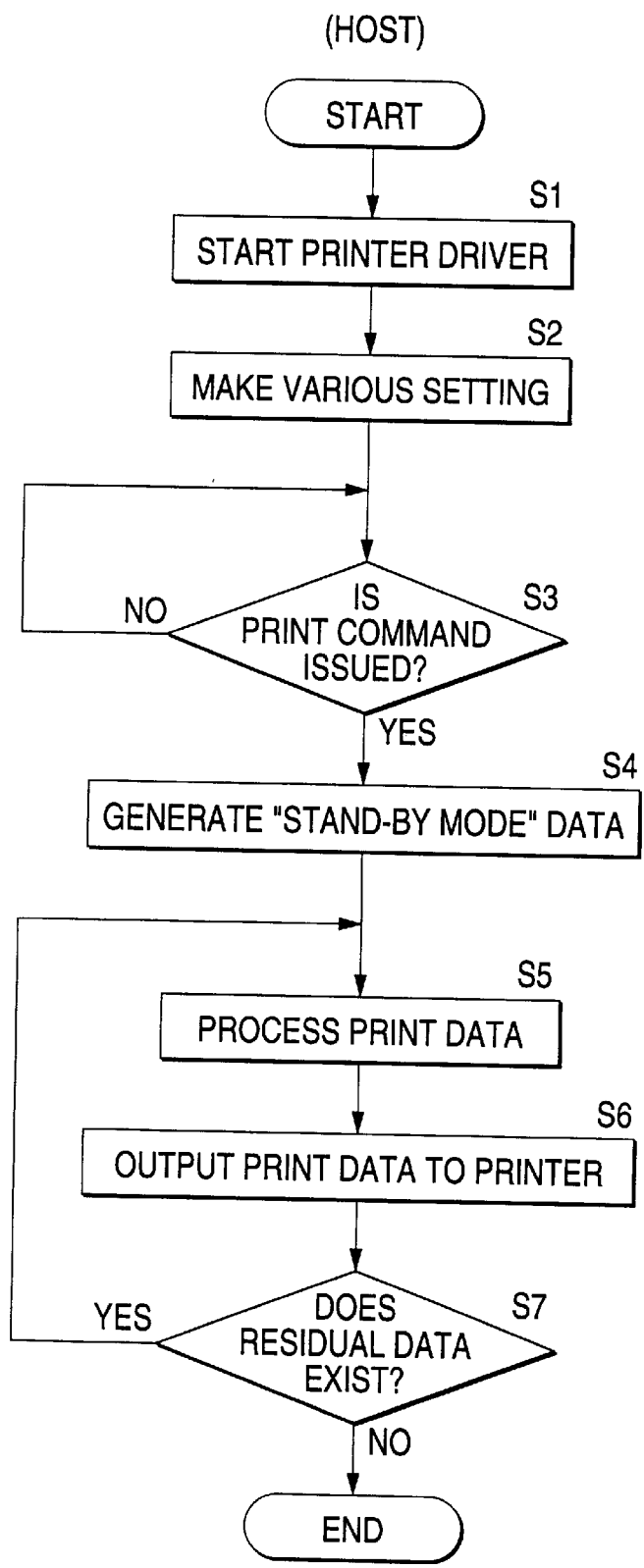
FIG. 2 is a flowchart showing a key part of a job executed in the host computer.
Figure 7:
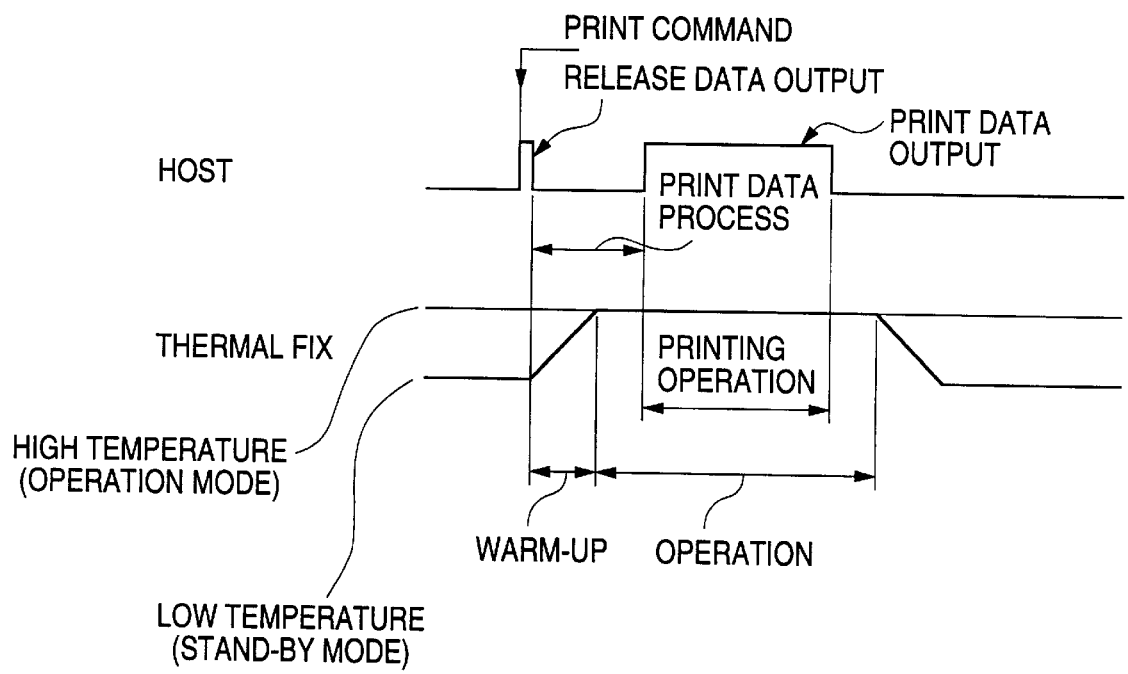
FIG. 7 is a timing chart showing the jobs of FIGS. 2 and 3 in a time sequential manner.

The operation of the printing system thus constructed will be described. As shown in FIG. 2, in the host computer 1, the printer driver 4 starts up in response to a print request by the user (step S1). Various settings for the printer driver 4 are made (step S2). Thereafter, the application 3 in the host computer waits for a print command to be issued by the keyboard 6 (step S3). If a print command is issued, the printer driver 4 first generates removal data which indicates removal of the "stand-by mode" (step S4) (FIG. 7). Then, the printer driver 4 processes print data (step S5).

In processing print data, the print data generating means 21 generates print data having the command format, the bit image format, and the like, which are adaptable to the printer 2, on the basis of data received from the s application 3, and writes the print data into the memory 5.

Figure 4:
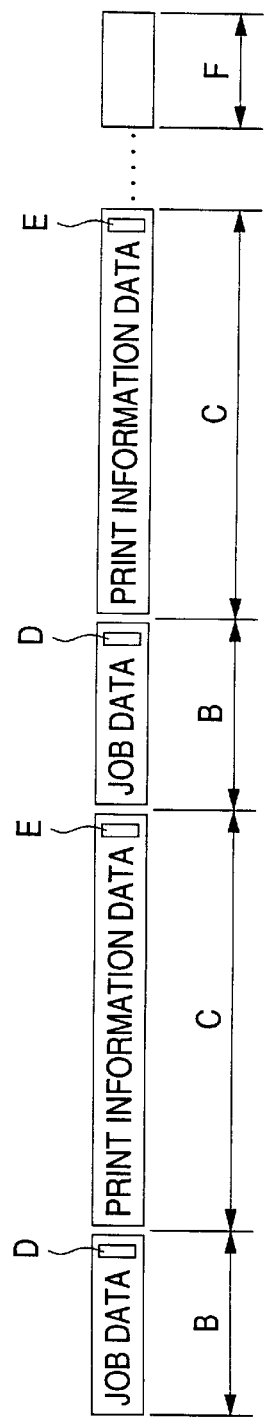
FIG. 4 is a diagram schematically showing an example of the data format of print data.

Print data is generally illustrated in FIG. 4. Although other arrangements are possible, and will be obvious to those of skill in the art, in the present embodiment the print data consists of job data parts B and print information data parts C. The job data parts and the print information data parts are alternately and serially arranged. The print information data parts C are for holding the print contents. For example, such print contents might pertain to characters to be printed on a page, and may be described in a particular printer language. The print information data parts contains information for managing the print information data, and information indicating which of a plural number of printer control code systems is used, which are described in the Job data language.

At the end of each print information data part C may be provided a command E which indicates a change to job data language. Command E may be referred to as a print information data part terminator. Similarly, at the end of each job data part B may be provided a command D which indicates a change to a given printer language. Command D may be referred to as a job data part terminator. A command F, which indicates the return of an altered setting to the original one is sometimes located at the end of the print data.

In the present invention, the data format of the removal data is the same as that of the print data. Any of the following three data formats may be used for the removal data, but other possibilities and permutations of the three examples below will be clear to one of skill in the art.

Figure 5:
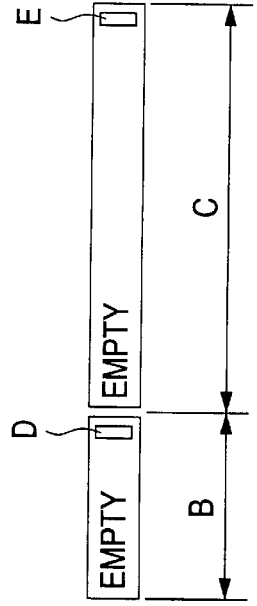
FIGS. 5(a) to 5(c) are diagram schematically showing three embodiments of the data format of removal data.
Figure 5:
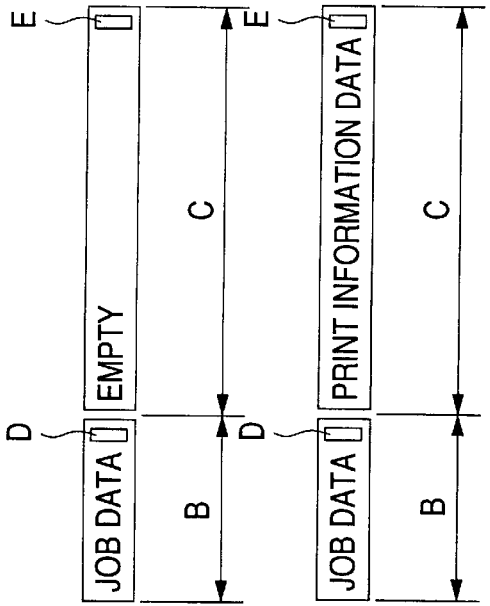

(1) In a first embodiment, the removal data is formatted as print data transmitted from the host computer to the printer side, and the removal data has a job data part B consisting of empty data and the command D, and the print information data part C consists of empty data and the command E. In the printing system, the meaning of the command E is modified so as to include the removal of stand-by mode in addition to a change to job language. Thus, whenever the printer receives the command E, and it is in stand-by mode, it automatically removes the stand-by mode. According to this embodiment, the host computer sends the removal data to the printer as shown in FIG. 5(*a*). That is, the removal data includes the job data parts B consisting of empty data and the command D located at the end thereof, and the print information data part C consisting of empty data and the command E located at the end thereof. In the printing system based on this data format, the detection of command E causes the stand-by mode automatically to be removed in the printing mechanism. Thus, the command E, which normally signals only a change to job language, is given the additional purpose of removing the stand-by mode of the printer mechanism. In other words, the removal data is effected by a command that is also used for some other purpose.

(2) According to a second embodiment of the removal data of the invention, the print data sent from the host computer to the printer side has an empty print information data part C terminated by command E, and the job data part B includes a job language command which raises a contradiction in its state. To explain further, the job data part B has a command which makes sense only if the print mechanism is in the operational mode. For example, a command which already exists in the job language is used, such as a command meaning "As for the job to be executed, inhibit the printing mechanism from entering a stand-by mode even if a preset time elapses without any printing." Clearly, if the printing mechanism is presently in a stand-by mode, such a job language command would raise a contradiction with its stand-by state. Such a command would thus provide an effective indication that the stand-by mode is to be removed. Similar to the first embodiment, the selection of this or a similarly contradictory command is advantageous because no new command need be created for the removal data. The particular job language command thus performs the function of removal data in addition to its other normal function. This removal data is shown in FIG. 5(*b*), and consists of job data part B containing the contradiction-raising command and print information data part C containing empty data.

(3) According to a third embodiment of the removal data, in the print data sent from the host computer to the printer, print information data part C contains print contents which cannot be printed (i.e., print contents of which the page is inhibited from printing). In the printing system using this data format, the printing mechanism receives the print data and removes its stand-by mode, and the control unit discards the print data. Accordingly, the printing operation is not performed, and only the wake-up mode is executed. The data format is as shown in FIG. 5(c). Depending on the particular print data selected, of course, command F may be required at the end of the print data.

Thus, in the present invention, the removal data takes advantage of commands normally used for some other purpose. Therefore, there is no need of providing any particular additional command.

Returning to FIG. 2, when the print data process ends in the step S5, the host computer outputs the generated print data (FIG. 4) to the printer (steps S6 and S7). The sequence of those procedural steps as mentioned above is repeated.

Figure 3:
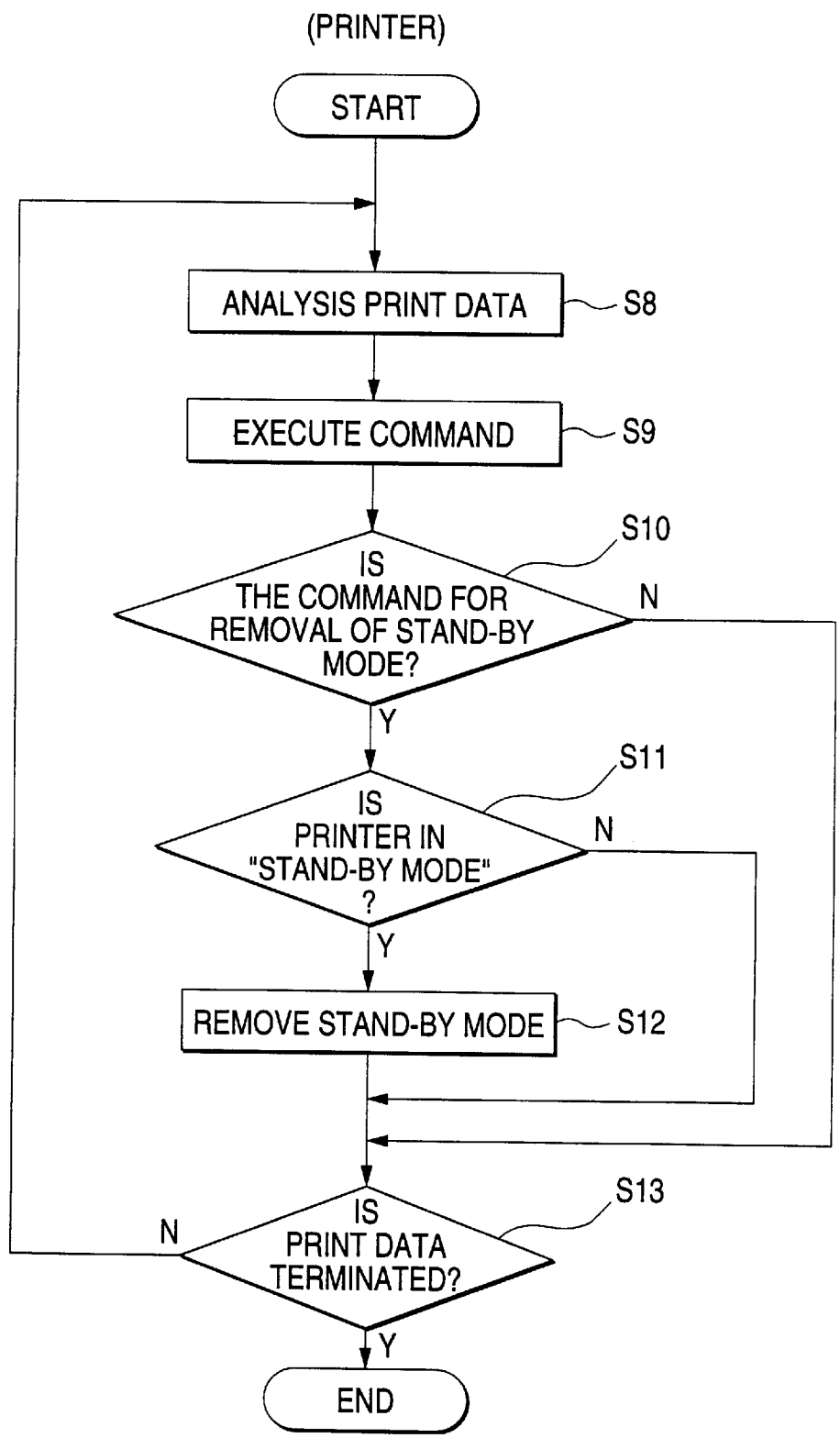
FIG. 3 is a flowchart showing a key part of a job executed in the printer.

The control unit 18 in the printer 2 operates the printing mechanism 19 in accordance with the print data from the host computer 1, thereby to execute a printing process. FIG. 3 shows a flow diagram of the printing process.

The print data received from the host computer is first analyzed (step S8), and the commands contained in the print data are executed (step S9). If a command for the removal of the stand-by mode is found in those received commands (step S10), it is judged whether or not the printer 2 is in a stand-by mode (step S11). If the printer 2 is in a stand-by mode, the printer removes the stand-by mode and enters the wake-up mode (step S12). If the print data is not terminated in the step S13, the control unit 18 returns to the step S8; if the print data is terminated, the control unit exits this routine.

If the printer 2 is in an operational mode, the control unit 18 advances to the next step, without executing the removal step S12. At this time, there is a chance in a conventional approach that the printer 2 might be driven by the removal data received from the host computer erroneously to print meaningless characters on the paper. In the present invention, however, there is no chance that the printer erroneously operates. As described above, the removal data of the present invention has the same data format as that of the print data (FIG. 4). Further, if it is detected at any other timing than the timing of the stand-by mode removal, the detected removal data does not have any adverse effect on the actual printing operation.

FIG. 7 is a diagram showing a transient change of operation of the printing system in which the printing mechanism enters a wake-up mode, and the thermal fixing unit 9 starts the warm-up operation and shifts its operation status from a stand-by state of low temperature to an operating state of high temperature. Actually, preset operations may be performed also in the other component units than the thermal fixing unit 9.

In the host computer, the outputting of the print data (step S6 in FIG. 2) to the printer is performed independently of a state of the printer. When the print data process and the print data outputting in the host computer are completed before the transient change of operation in the printer, the sending of the print data from the host computer to the printer starts at the time of completing the print data process and the print data outputting. When the print data of one page is completed and a bit image is generated, and the printer is put in an operable state, the printing mechanism starts the printing operation upon completion of the transient change of operation in the printer. If one of the operations by the host computer and the printer lags the other, the printing mechanism 19 will start its printing operation immediately after the two conditions are satisfied. Therefore, the first print waiting time is reduced.

While the present invention has been described using the specific embodiments thereof considered at present to be preferred, it should be understood that the present invention is not limited to the above-mentioned embodiments but may variously be modified, changed, and altered within the spirit and scope of the invention. For example, the hardware configuration of the printing system is not limited to that shown in FIG. 1. The printing process of the printing system is also not limited to that shown in FIGS. 2 and 3. The mechanical construction of the printing system is not limited to that illustrated in FIG. 6.

As is recognized by one of skill in the art, various hardware components may be implemented with software, and software may be replaced with corresponding hardware. The implementation of the present invention may be accomplished by modifying the software in the host section, and by modifying the software in the printer section, either directly or via download through the host section.

To review, in the printing system of the present invention, in response to an issued print request, the host computer sends to the printer a command indicative of removing a stand-by mode of a printing mechanism in the printer, through the same host interface as for the normal print data, before it sends the normal print data to the printer. In response to the removal data, the printer starts a wake-up operation before the host computer starts sending print data to the printer. The data processing by the host computer and the wake-up operation by the printer are concurrently performed. As a result, a time from the issuance of the print command till the first print is produced is reduced.

In the invention, there is no need to provide an additional host interface, and the utilization of only a conventional hardware resource is required. The data format of the normal print data is used for the removal data. The application of the data format to the removal data is extremely easy.

I claim:

1. A printing system, comprising:
    a printing device having a stand-by mode for conserving power when not printing; and
    a host device including:
        print data generating means for generating print data compatible with said printing device and for outputting said print data thereto, and
        outputting means for outputting removal data to said printing section prior to said generating of said print data generating means;
    said printing device having a printing mechanism which performs a printing operation in accordance with said print data, and having control means for removing said stand-by status of said printing mechanism in response to detecting said removal data;
    said removal data and said print data share an identical signal path between said host device and said printing device.

2. The printing system of claim 1, wherein said removal data and said print data have an identical signal format.

3. The printing system of claims 1 or 2, wherein:
    said print data and said removal data have an identical data format, said data format including a job data part and a print information data part, said job data part being one of no command and a job command selected from a set of job commands of a job language, said print information data part having a content according to a printer language;

said job data part of said removal data does not contain a command which can be used only for said removal of said stand-by status of said printing mechanism.

4. The printing system of claim 3, wherein:

said data format further includes a job data part terminator at the end of said job data part and a print information data part terminator at the end of said print information data part; and said control means detects said removal data by detecting said print information data part terminator thereof.

5. The printing system of claim 4, wherein said print information data part of said removal data contains information which is discarded, without being printed, by said printing mechanism.

6. The printing system of claim 5, wherein said job information data part of said removal data is empty.

7. The printing system of claim 5, wherein said print information data part of said removal data is empty.

8. The printing system of claim 7, wherein said job information data part of said removal data is empty.

9. The printing system of claim 3, wherein:

said job data part of said removal data includes a selected one of said job commands which has a respective meaning which is in contradiction with said stand-by state of said printing mechanism; and said control means detects said removal data by detecting said selected one of said job commands.

10. The printing system of claim 9, wherein said print information data part of said removal data is empty.

11. The printing system of claim 9, wherein said print information data part of said removal data contains information which is discarded, without being printed, by said printing mechanism.

12. A method of removing a stand-by state of a printing mechanism in a system for printing data provided by a host section to a printing section having said printing mechanism which assumes said stand-by state under control of a printing section controller, the method comprising the steps of:

providing removal data from said host section to said printing section along a shared signal path;

performing detection of said removal data, said detection being performed by said printing section controller;

removing said stand-by state of said printing mechanism in response to said detection; and generating and supplying print data to said printing section along said shared signal path after said step of providing removal data to said printing section.

13. The method of removing said stand-by state as set forth in claim 12, wherein said removal data and said print data have an identical signal format.

14. The method of removing said stand-by state as set forth in claims 12 or 13, wherein:

said print data and said removal data have an identical data format, said data format including a job data part and a print information data part, said job data part being one of no command and a job command selected from a set of job commands of a job language, said print information data part having a content according to a printer language;

said job data part of said removal data does not contain a command which can be used only for said removal of said stand-by status of said printing mechanism.

15. The method of removing said stand-by state as set forth in claim 14, wherein:

said data format further includes a job data part terminator at the end of said job data part and a print information data part terminator at the end of said print information data part; and said control means detects said removal data by detecting said print information data part terminator thereof.

16. The method of removing said stand-by state as set forth in claim 14, wherein:

said job data part of said removal data includes a selected one of said job commands which has a respective meaning which is in contradiction with said stand-by state of said printing mechanism; and said control means detects said removal data by detecting said selected one of said job commands.

17. A program supplying medium for supplying, to a computer, a program which, when executed by the computer, causes the computer to perform the steps of:

executing a process for storing and converting image data and transferring the image data to a printing device, characterized in that the program supplying medium retains a set of instructions in the format that the computer can understand, the instruction set causing the computer to carry out a removal data outputting process in which the computer outputs to the printing device data removal data indicative of removing a stand-by state of a printing mechanism contained in the printing device before the computer generates print data, and executing a print data transmitting process in which, after outputting the removal data to the printing device, the computer generates print data compatible with the printing device and outputs the generated print data to the printing device.

18. The program supplying medium according to claim 17, wherein the program supplying medium is one of:

a storage medium for fixedly storing the instruction set, and a communication medium for dynamically retaining the instruction set.

19. A printing system, comprising:

a printing device having a stand-by mode for conserving power when not printing; and a host device including:

print data generating means for generating print data compatible with said printing device and for outputting said print data thereto, and outputting means for outputting removal data to said printing section prior to said generating of said print data by said print data generating means;

said printing device having a printing mechanism which performs a printing operation in accordance with said print data, and having control means for removing said stand-by status of said printing mechanism in response to detecting said removal data.

* * * * *